(12) United States Patent
Sieger

(10) Patent No.: US 8,791,584 B2
(45) Date of Patent: Jul. 29, 2014

(54) STRUCTURALLY INTEGRATED ELECTRIC/HEAT GENERATING ENERGY RECOVERY (SIEGER)

(76) Inventor: Charles Martin Sieger, Miami, FL (US)

( * ) Notice: Subject to any disclaimer, the term of this patent is extended or adjusted under 35 U.S.C. 154(b) by 101 days.

(21) Appl. No.: 13/159,920

(22) Filed: Jun. 14, 2011

(65) Prior Publication Data

US 2012/0321383 A1    Dec. 20, 2012

(51) Int. Cl.
F02B 63/04    (2006.01)
F03G 7/08    (2006.01)

(52) U.S. Cl.
USPC .......................................................... 290/1 R

(58) Field of Classification Search
USPC .......................................................... 290/1 R
See application file for complete search history.

(56) References Cited

U.S. PATENT DOCUMENTS

| | | | | |
|---|---|---|---|---|
| 3,602,082 | A * | 8/1971 | Hoagland | 84/103 |
| 3,603,215 | A * | 9/1971 | Leschisin | 92/182 |
| 3,604,610 | A * | 9/1971 | Fortune | 228/20.5 |
| 3,614,143 | A * | 10/1971 | Stevens | 403/334 |
| 3,985,064 | A | 10/1976 | Johnson | |
| 4,295,066 | A | 10/1981 | Lloyd et al. | |
| 4,500,827 | A | 2/1985 | Merritt et al. | |
| 4,614,875 | A | 9/1986 | McGee | |
| 4,635,908 | A * | 1/1987 | Ludwig | 267/64.11 |
| 5,254,893 | A * | 10/1993 | Ide | 310/90 |
| 5,347,186 | A * | 9/1994 | Konotchick | 310/17 |
| 5,395,179 | A * | 3/1995 | Kotani | 404/71 |
| 5,448,436 | A * | 9/1995 | Albrecht | 360/256.4 |
| 5,818,132 | A | 10/1998 | Konotchick | |
| 5,864,447 | A * | 1/1999 | Matsumoto et al. | 360/265.1 |
| 6,054,692 | A | 4/2000 | Hitomi et al. | |
| 6,095,201 | A * | 8/2000 | Zenoni et al. | 139/452 |
| 6,199,381 | B1 * | 3/2001 | Unger et al. | 60/520 |
| 6,535,359 | B1 * | 3/2003 | Boutaghou | 360/256.4 |
| 7,060,950 | B1 | 6/2006 | Harita | |
| 7,102,244 | B2 | 9/2006 | Hunter, Jr. | |
| 7,164,211 | B1 | 1/2007 | Tafoya et al. | |
| 7,432,607 | B2 | 10/2008 | Kim et al. | |
| 7,589,428 | B2 * | 9/2009 | Ghassemi | 290/1 R |
| 2003/0034652 | A1 | 2/2003 | Slatkin | |

OTHER PUBLICATIONS

What is Rubberized Asphalt. Arizona Department of Transportation. Mar. 14, 2009 [retrieved on Feb. 11, 2013]. Retrieved from the Internet: <URL: www.azdor.gov/quietroads/what_is_rubberized_asphalt.asp>.*

* cited by examiner

Primary Examiner — Tulsidas C Patel
Assistant Examiner — Thomas Quigley
(74) Attorney, Agent, or Firm — Malloy & Malloy, P.L.

(57) ABSTRACT

A structurally integrated modular system for energy recovery from vehicular traffic as further disclosed. The system comprises an "X" & "Y" axis horizontal array of Linear Electromagnetic Generators, (LEGs), in a close packed hexagonal or other shaped structural grid, as further disclosed. Each LEG is spring-less, using a high strength main core magnet, and a fixed lower magnet to repel the main core magnet at a designed coercive restoring force. The plurality of LEGs are contained within Modular Prefabricated Structural Sandwich Composite Panels, (MPSSCPs), designed to be placed upon a roadway surface, (whose upper surfaces are flexible and lower surfaces semi-rigid). The resultant energy recovery is thereby converted to electric power and heat. The MPSSCPs, and their accessory panels are thereby installed upon a roadway bearing surface to generate clean electric power and heat, which thaws ice and snow, when and where necessary.

14 Claims, 5 Drawing Sheets

STRUCTURALLY INTEGRATED ELECTRIC/HEAT GENERATING ENERGY RECOVERY (SIEGER)

SEQUENCE LISTING

"Not Applicable"

CROSS-REFERENCES TO RELATED APPLICATIONS

"None"

STATEMENT REGARDING FEDERALLY SPONSORED RESEARCH OR DEVELOPMENT

This invention was not made under contract or funding of any kind by/and or with any agency of the United States government.

THE NAMES OF THE PARTIES TO A JOINT RESEARCH AGREEMENT

"Not Applicable"

INCORPORATION-BY-REFERENCE OF MATERIAL SUBMITTED ON A COMPACT DISC

"Not Applicable"

BACKGROUND OF THE INVENTION

1. Field of the Invention

The present invention generally relates to a plurality of Modular Prefabricated Structural Sandwich Composite Panels (MPSSCPs), with its attendant accessory panels placed on a road surface. The invention has the ability to withstand lateral forces generated by accelerating and decelerating vehicles and to recover kinetic and gravitational energies generated by moving vehicles, along with the ability to generate electrical current and selective quantities of heat as well as resurface roadways.

"Clean Energy Living Life Sustainably", not nuclear (fusion or fission), or the use of any type of fuel, bio-technical or direct hydrocarbon based, geothermal, solar, wind, wave, hydroelectric, photosynthetic, battery technology or fuel cell related energy generation is used. This invention is CO2 emission free, with its embodiment made from a majority of recycled and/or recyclable materials, where the invention has a minimized carbon footprint.

In addition, heat generated by the electrical resistive forces and friction generated within the Linear Electromagnetic Generators, (LEGs), will melt ice and snow relieving major arterial roadways of salt and other elemental pollutants, thus increasing safety in major urban areas and reduce costs of roadway maintenance and repairs, all of which have significant impacts.

The heat generated, although minimally inherent in the system, must be optimized for latitudes and annual snowfall rates by adjusting within the LEG, using Faraday-Lenz Laws, the main core magnet's gauss, magnet wire diameter (AWG), and the number of coil turns. The LEG resultant resistance (OHMS) when optimized for its given values, will produce heat of varying amounts.

2. Background Art

The invention having its embodiment of few moving parts is "spring less", "fluid less", avoids short term wear, spring and complicated mechanism fatigue and failure, as well as fluid leakage that may result in pollution, as described in the prior arts related to roadway power generation.

In addition, many of the prior arts are either inefficient at recovery and conversion of energies, or are excessively complex, and are contained "within" the roadway. The prior arts are also subject to extensive maintenance and repair issues, with attendant pollution problem probabilities, as well as fire resistivity issues. The prior arts: U.S. Pat. No. 4,295,066 to Lloyd et. al., U.S. Pat. No. 4,614,875 to McGee, U.S. Pat. App. US2003/0034652 A1 to Slatkin, U.S. Pat. No. 7,432,607 B2 to Kim et. al., U.S. Pat. No. 7,589,428 B2 to Ghassemi, U.S. Pat. No. 7,102,244 B2 to Hunter, also contain excessive reliance on springs that do not necessarily take advantage of motion in the vertical rebound, the "z" axis, thereby reducing the percentage of energy recovery potential.

The prior arts: U.S. Pat. No. 5,395,179 to Kotani, U.S. Pat. No. 6,054,692 to Hitomi et. al., U.S. Pat. No. 7,060,950 B1 to Harita, propose heat generation and do not incorporate the ability for power generation.

The prior arts: U.S. Pat. No. 4,500,827 to Merritt et. al., U.S. Pat. No. 4,614,875 to McGee, U.S. Pat. No. 5,347,186 to Konotchick, U.S. Pat. No. 5,818,132 to Konotchick, U.S. Pat. App. US2003/0034652 A1 to Slatkin, U.S. Pat. No. 7,102,244 B2 to Hunter, U.S. Pat. No. 7,164,211 B1 to Tafoya et. al., U.S. Pat. No. 7,432,607 B2 to Kim et. al. deal with electric power generation thru electro mechanical devices, but do not incorporate and explain the ability to generate heat for melting ice and snow.

In the prior arts cited the combination of resurfacing roads with a deployment of modular prefabricated panels for electric power, heat generation, and autopilot potential is not mentioned.

BRIEF SUMMARY OF THE INVENTION

The primary objective of the invention is to provide a means of generating electrical energy in a "clean" and efficient manner by recovering vehicular generated energy using a plurality of Linear Electromagnetic Generators, (LEGs), contained within Modular Prefabricated Structural Sandwich Composite Panels, (MPSSCPs), upon a roadway surface. A second objective is to provide dispersed heat within the road's upper most surface where and when applicable for the thawing of snow and ice. The third objective is to resurface existing roadway surfaces where the system is applied. The fourth objective is to create a structurally stable surface that can withstand both lateral and vertical forces applied to it. A fifth objective is to establish the systems long term incremental repair and maintenance thru the use of modular panels. A sixth objective would be for future vehicular traffic, by way of a magnetic sensing device attached to a vehicle to aid in the creation of autopilot devices for vehicles.

BRIEF DESCRIPTION OF THE SEVERAL VIEWS OF THE DRAWINGS

The accompanying drawings, which are incorporated in and form part of the specification, illustrate embodiments of the present invention and, together with the description, serve to explain the principles of the invention. The drawings provided herein are not drawn to scale.

Figure 1:
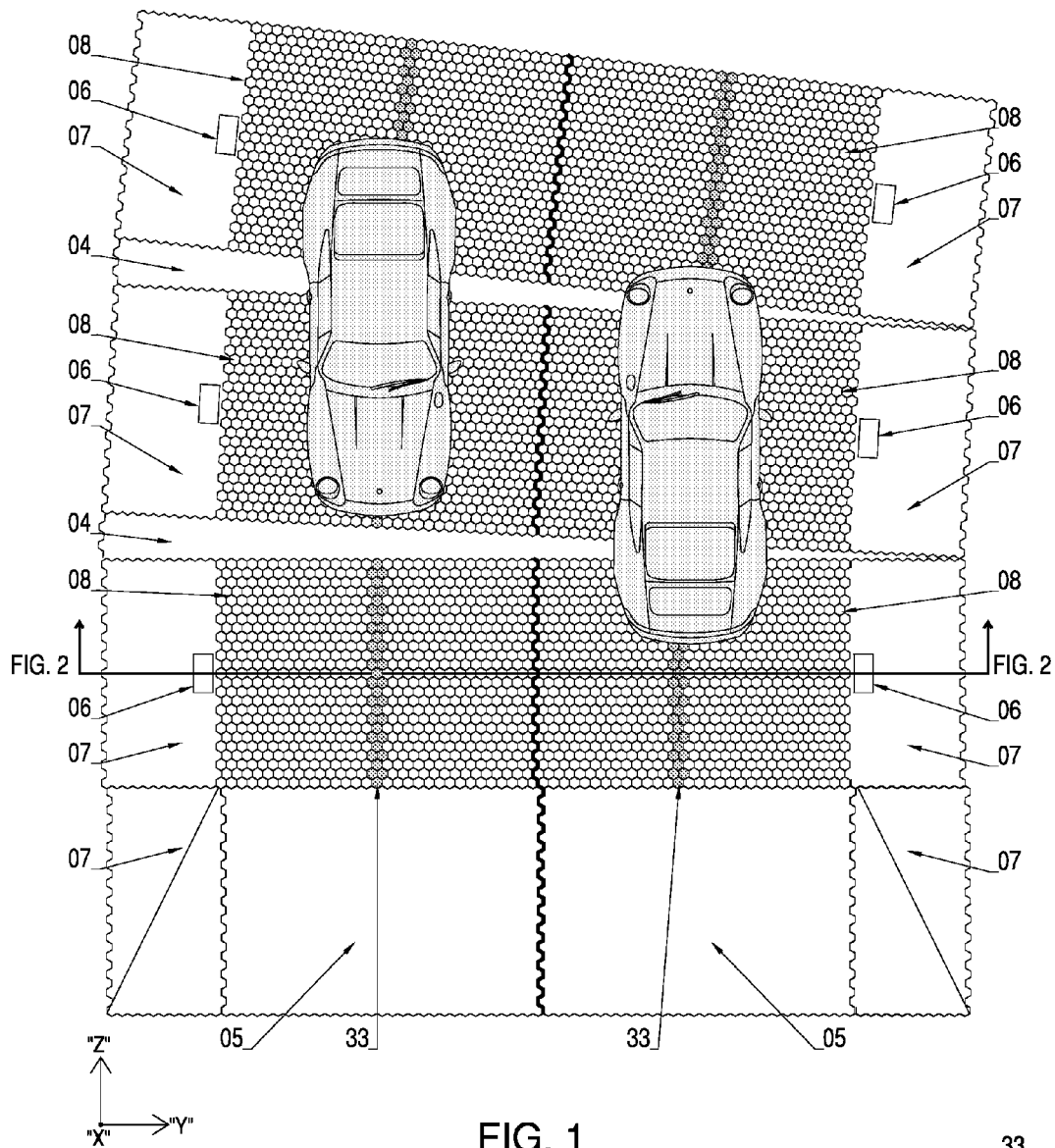
FIG. 1 is a schematic plan illustration of an embodiment of Modular Prefabricated Structural Sandwich Composite Panels (MPSSCPs), and its accessory panels, of the inventions configuration on a roadway surface.

| INDEX OF REFERENCE NUMERALS | |
|---|---|
| 01 | Static Area of Influence |
| 02 | Area of Influence |
| 03 | Vehicles' Tire |
| 04 | Modular Prefabricated Structural Sandwich Composite "Wedge" Shaped Panel |
| 05 | Modular Prefabricated Structural Sandwich Composite Entry and Exit "Ramp" Panel |
| 06 | Electric Linkage Apparatus |
| 07 | Modular Prefabricated Structural Sandwich Composite "Shoulder" Panel |
| 08 | Modular Prefabricated Structural Sandwich Composite Panel (MPSSCP) |
| 09 | Linear Electromagnetic Generator (LEG) |
| 10 | Uppermost Surface |
| 11 | Crumb Rubber |
| 12 | Aggregate |
| 13 | Composite Tread Design |
| 14 | Insert Rod |
| 15 | Foil |
| 16 | Multi-Legged Retaining Guide |
| 17 | Free Air Space |
| 18 | Main Core Magnet |
| 19 | Insert Guide |
| 20 | Clearances |
| 21 | Magnet Wire Coil |
| 22 | Multi-Legged Retaining Guide Pongs |
| 23 | Coercive Restoring Force |
| 24 | Slotted Air Space |
| 25 | Interior Fluted Surface |
| 26 | O-ring |
| 27 | Hexagonal Structural Grid |
| 28 | Lower Magnet |
| 29 | Exit Wiring |
| 30 | Wire Trough |
| 31 | Semi-Rigid Material |
| 32 | Roadway Surfaces |
| 33 | Linear Electromagnetic Generator (LEG) omitted at center along the "X" axis. |

DETAILED DESCRIPTION OF THE INVENTION

Upon review of the detailed description of the accompanying drawings provided and made a part herein, it will be apparent to a person of ordinary skill in the art that the roadway electric power generating system made of a plurality of Modular Prefabricated Structural Sandwich Composite Panels, (MPSSCPs) (08) can be used in a number of different configurations and applications. Accordingly, the present invention is not limited to the structures or configurations specifically described herein. The disclosed system, however, is in particular adapted for roadway electric power generating applications.

Figure 2:
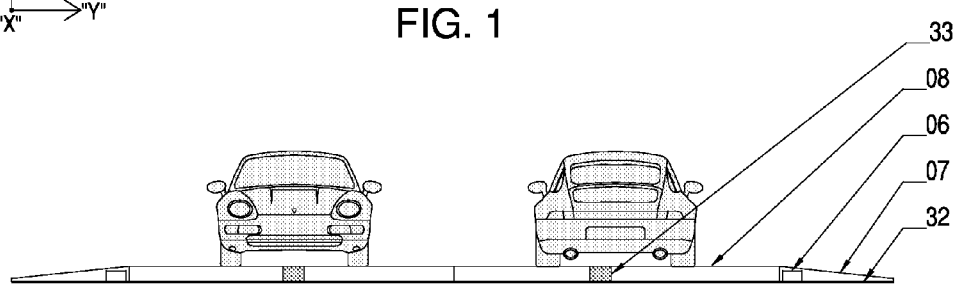
FIG. 2 is a schematic elevation illustration of an embodiment of MPSSCPs, of the inventions configuration on a roadway surface.
Figure 3:
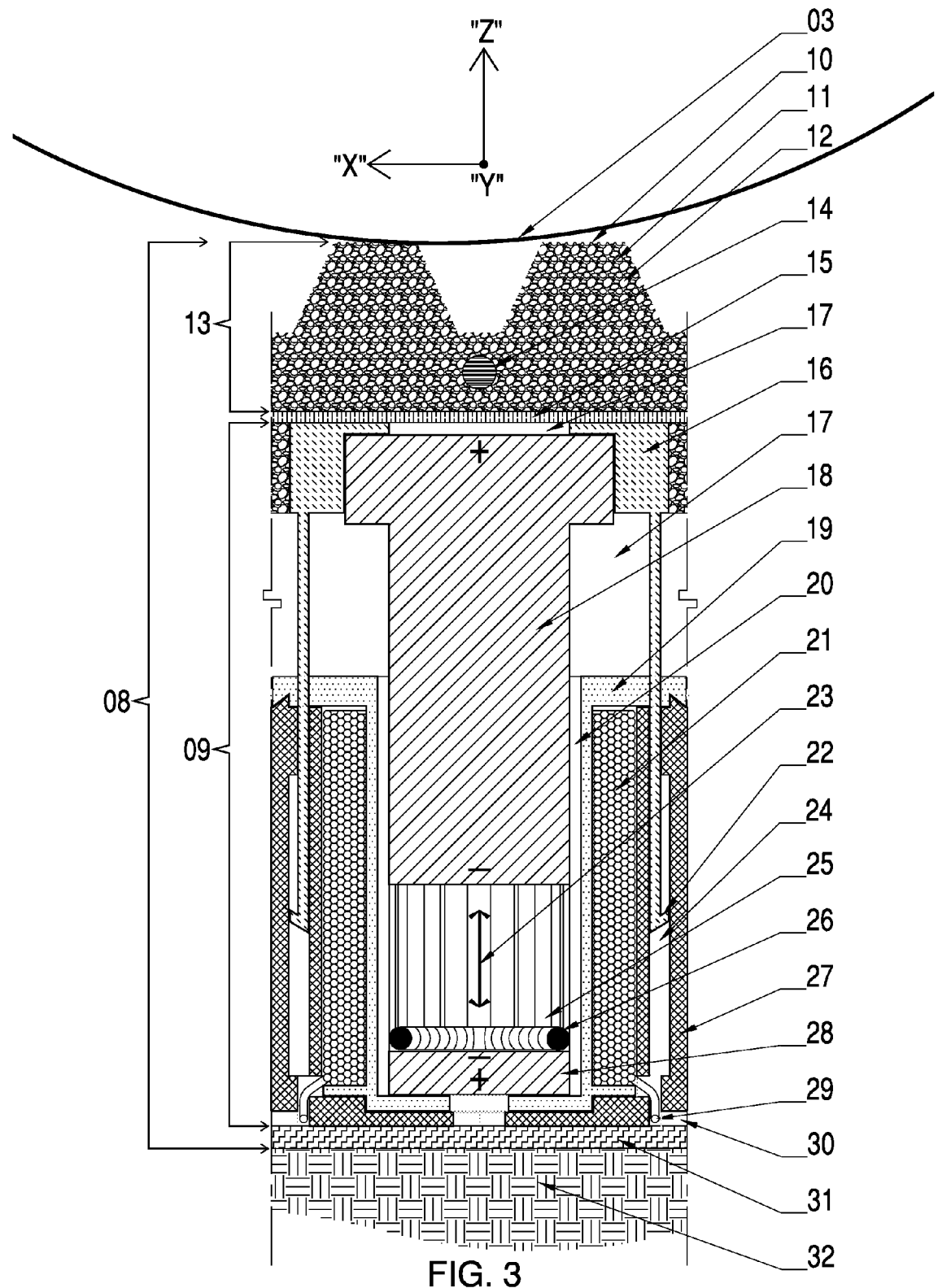
FIG. 3 is a schematic sectional illustration of an embodiment of a Linear Electromagnetic Generator, (LEG), of the inventions most preferable configuration whose plurality is within MPSSCPs on roadway surfaces.
Figure 4:
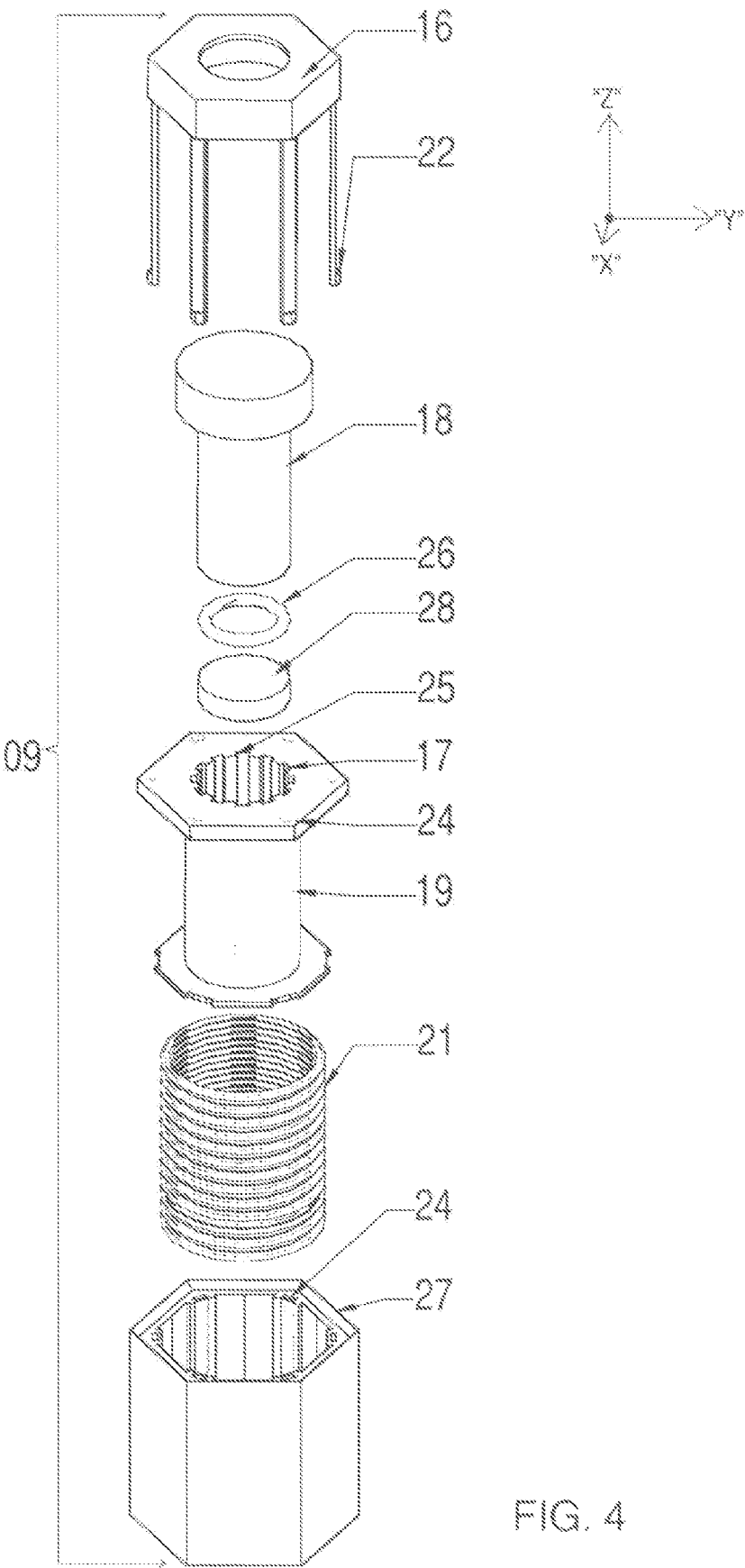
FIG. 4 is an exploded isometric illustration of the parts as described in the LEG.

FIG. 1 is a schematic plan illustration showing the preferred embodiment of the structurally integrated electric and heat generating energy recovery system consisting of a plurality of MPSSCPs (08) as comprised in FIG. 3 and accessory panels (04), (05), and (07) as further defined in FIG. 1, and FIG. 2 with its embodiments in the illustrations and specifications contained herein.

It is also in this embodiment that the rapid response time for the vertical redeployment of the main core magnet in the LEGs, will take substantial advantage of higher density vehicular traffic in urban areas where electrical demands are greater and generally match in timing with peak vehicular traffic loads.

The preferred method of fabrication of the invention, is the factory production of the Modular Prefabricated Structural Sandwich Composite Panels, (MPSSCPs) and its accessory panels by various production facilities spread throughout geographic regions. These facilities could then deploy and install the system to minimize carbon footprint, increase quality control, and facilitate the creation of numerous employment opportunities for production, deployment, and repair. The embodiment will thereby resurface and update roadway surface infrastructure with minimal disruption and ultimately reduce the need for other "environmentally less desirable" or inconvenient electric generating facilities.

The modularity of this invention allows for future maintenance, repair, and/or recycling on an incremental basis.

Modular Prefabricated Structural Sandwich Composite "Shoulder" Panels (07), as further described, with its embodiments as contained in the illustrations and specifications herein (FIGS. 1 thru 8). Accessory Modular Prefabricated Structural Sandwich Composite Shoulder Panels (07) embody a shoulder panel being deployed and installed/interlocked/bonded and or affixed, adjacent to the edge of the roadways main vehicular surface. The shoulder panel (07) which receives wiring from the wire troughs (30) contains electric linkage apparatus (06) of prior arts connecting the shoulder panels (07) electronically thereby containing inversion/conversion and or rectification as accomplished in prior arts to transmit electric energy to existing electrical grids; electrical storage systems and or redeploy the electrical energy back to electric vehicles, as accomplished in prior arts. For night-time and day-time heating when latitude/longitude and snowfall analysis of the invention's geographical deployment dictates the necessity for a net heat generating adjustment, electrical prior arts may redeploy power back into the MPSSCPs (08).

The MPSSCPs' (08), main embodiment is electrical generation. Heat although minimally inherent in the system must be optimized for latitudes/longitudes and annual snowfall rates by adjusting within the Linear Electromagnetic Generator, (LEG) (09), by Faraday-Lenz Laws, the inductive resistance, (OHMS), by way of; magnet wire diameter, (AWG) (21), number of turns for the LEGs' (09) given size, and magnetic (gauss) coercive forces to control voltage output and heat produced, where the adjusted electrical resistance plus the frictional resistance within the LEG (09) results in heat, which is then diffused throughout the uppermost surface (10) of the tread design (13), by way of the foil (15) within the MPSSCPs (08) to thaw ice and snow.

Modular Prefabricated Structural Sandwich Composite Entry and Exit "Ramp" Panels (05) as described in the illustration FIG. 1, with its embodiment as contained in the specification herein is a roadway transitional vehicular lane entry and vehicular discharge ramp (05), which embodies tri-axial characteristics in the "X, Y & Z" axis of various tri-axial flexibilities, thereby being interlocked/sintered/bonded and or affixed to at least one of the transmitting MPSSCPs (08).

Modular Prefabricated Structural Sandwich Composite "Wedge" Shaped Panels (04) as further described in FIG. 1 with its embodiment as contained in the specification herein. A modular embodiment of a sectional wedge (04) which may or may not contain LEGs (09), with/and or without main magnet cores (18), magnet wire coils (21), insert guides, (19) or multi-legged retaining guides (16) of which the embodiment of the wedge shaped panels (04) may contain a portion of the MPSSCP (08) along with the hexagonal structural grid (27) FIG. 7 and FIG. 8, utilized to accommodate existing roadway surfaces along the "X & Y" axis for curves and/or tangential radial roadway changes in the "X" and "Y" axis.

FIG. 1 is a schematic plan and FIG. 2 is an elevation illustration of a two lane configuration showing the preferred embodiment of the MPSSCPs (08) and its constituent parts and accessories as further described herein.

The embodiment of multiple MPSSCPs (08) with or without accessory Shoulder Panels (07), Wedge Panels (04), or Ramp Panels (05), interlocked/sintered/bonded and or affixed to the roadway surface may be assembled for multilane roads of varying number of driving lanes and vehicular traveling directions.

FIG. 3 the LEG (09) as described in the schematic sectional illustration is embodied with a bonded (Neodymium, Iron, Boron) NdFeB, main core magnet (18) as a preferable material; this magnet type, being one suitable magnetic material with a coercive restoring force (23) "gauss" moderately high, that can not easily be demagnetized.

The aforementioned LEG (09), main core magnet (18) in addition, shall be coated with a material suitable, for low frictional resistance, high magnetic permeability, low coefficient of expansion and surface wear durability, eg. chromium on nickel on copper on NdFeB.

Further embodiment of the LEG (09) is the insert guide (19) consisting of a preferable material of a recycled and or recyclable nature, of a rigid polymer whose interior fluted surface (25) reduces wear and friction and creates a free air space (17) that reduces damping, that is wrapped by a magnet wire coil (21) having varying diameters and number of windings whose electromagnetic capabilities are further described herein.

Figure 5:
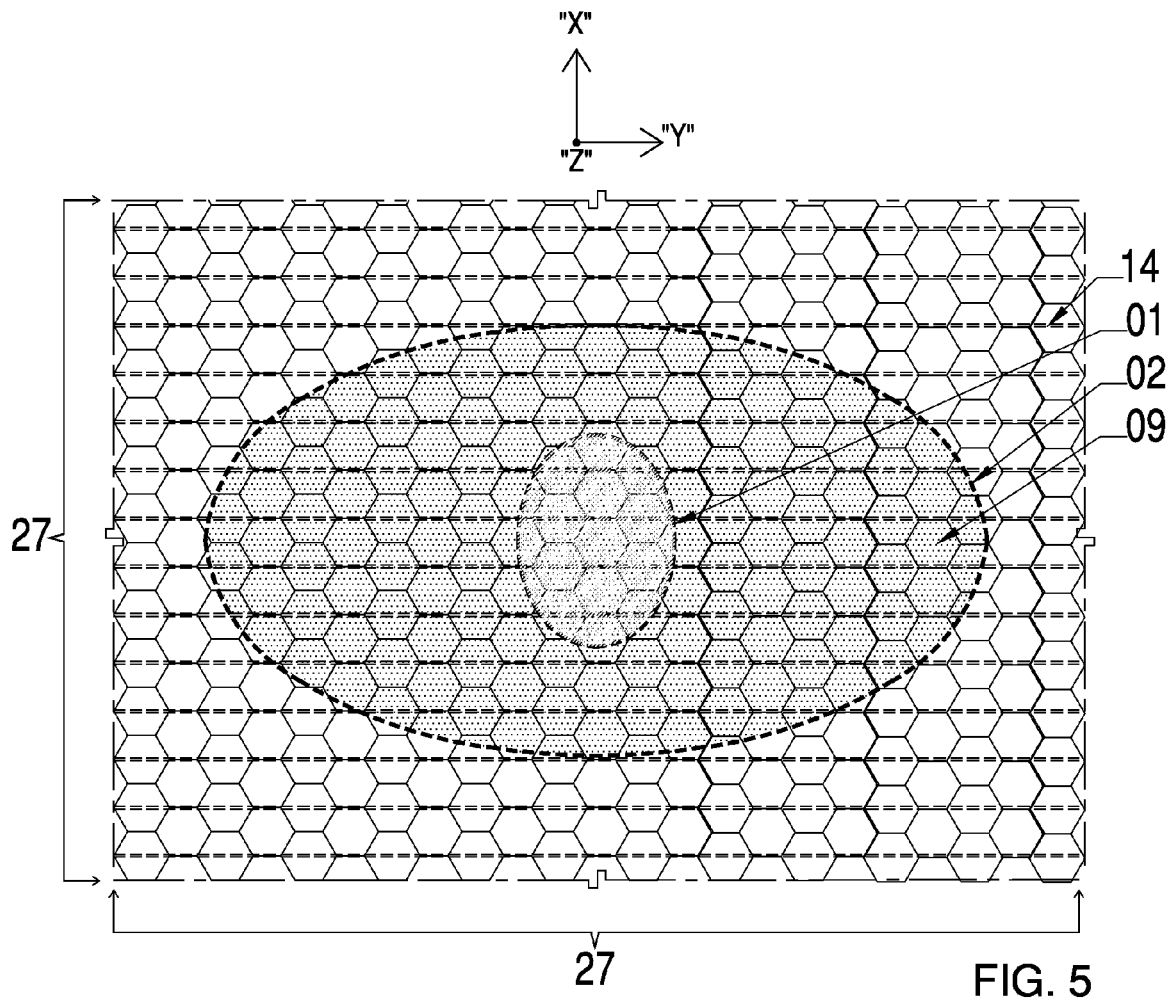
FIG. 5 is a schematic plan view illustration of the area of influence of a vehicle's tire showing the bi-axial direction of the surface stiffness differentiation in the "X and Y" axis.

The insert guide (19) contains a sintered/bonded and or affixed lower magnet (28). The magnetic force (gauss) utilized in the lower magnet (28) opposes the linear moving main core magnet (18) each of differential gauss thereby creating a coercive restoring force (23) for the main core magnet (18) which is deployed by vehicles' tires' (03) gravitational action on the uppermost surface (10) upon a plurality of LEGs (09), as also shown in FIG. 5 "Static Area of Influence" (01). This lower magnet (28) facilitates in the embodiment of the invention a "spring-less" advantage that further allows an upward induction response (in the "Z" axis) of an electrical output. This creates AC voltage of a varying frequency (Hz) as a result of the volume and speed of vehicular traffic caused by the downward ("Z" axis) gravitational motion induced by the vehicles' tires and the upward rebounding motion ("Z" axis) induced by the differential gauss coercive force of the main core magnet (18) and the fixed lower magnet (28).

Several advantages of the LEG (09) become evident by expanding the Faraday-Lenz Laws, for the adjustment of the resultant resistant (OHMS), considering the motion of the main core magnet (18) to occur substantially along the "Z" axis, in which the permeability of the free space (17) surrounding the main core magnet (18) allows air flow to disperse heat into the air surrounding the main core magnet (18) and onto the foil (15) and subsequently throughout the uppermost surface (10). The main core magnet (18), the insert guide (19), with its described configuration and clearances (20), allow for free motion of the main core magnet (18) into the insert guide (19). The insert guide (19) is surrounded by a magnet wire coil (21) wound around the insert guide (19) with clearances (20), allowing for motion of the main core magnet (18) up and down along the "Z" axis of the insert guide (19), internal to the LEGs (09) and the MPSSCPs (08).

In addition, there is a multi-legged retaining guide (16) contained within the MPSSCP (08) which is installed over the main core magnet (18) and the multi-legged retaining guide prongs (22) inserted thru the insert guide (19) thereby restricting the main core magnet (18) from being displaced from the insert guide (19). In addition, the multi-legged retaining guide (16) aids in lateral load reinforcement by creating tension in the multi-legged retaining guide prongs (22) of the multi-legged retaining guide (16) as inserted thru the insert guide (19), and into the hexagonal structural grid (27), with the multi-legged retaining guide (16) moving up and down in the "Z" axis in the slotted air space (24) contained within the hexagonal structural grid (27). This facilitates in the "X" and "Y" axis horizontal force resistance on the uppermost surface (10) of the MPSSCP (08).

The motion up and down, "Z" axis, of the main core magnet (18), within each LEG (09), within the insert guide (19) will induce voltage in the magnet wire coil (21). The main core magnet's (18) movement in the "Z" axis, terminates with its underside at an o-ring (26) made of an elastic recycled and/or recyclable polymer material, with flexibility to resist excessive forces beyond the coercive restoring force at the area of influence (02), FIG. 5 exerted on the uppermost tread surface of the MPSSCP system (08). The o-ring (26) resides in a notched/grooved and or inset; sintered/bonded and or affixed on the upper surface of the lower magnet (28). The lower magnet (28) being sintered/bonded and or affixed to the base of the insert guide (19) which is intern inserted into the hexagonal structural grid (27).

Figure 6:
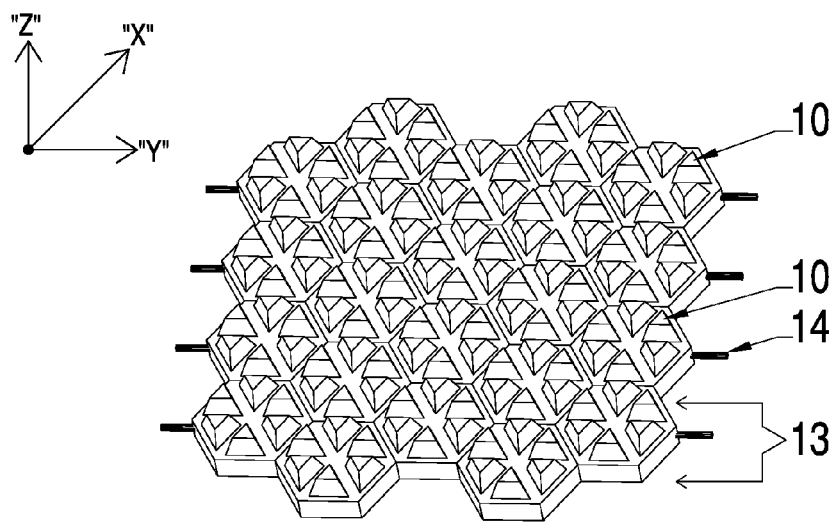
FIG. 6 is an isometric illustration of a potential composite tread design of the MPSSCP uppermost surface as the inventions most preferable configuration on a roadway surface.
Figure 7:
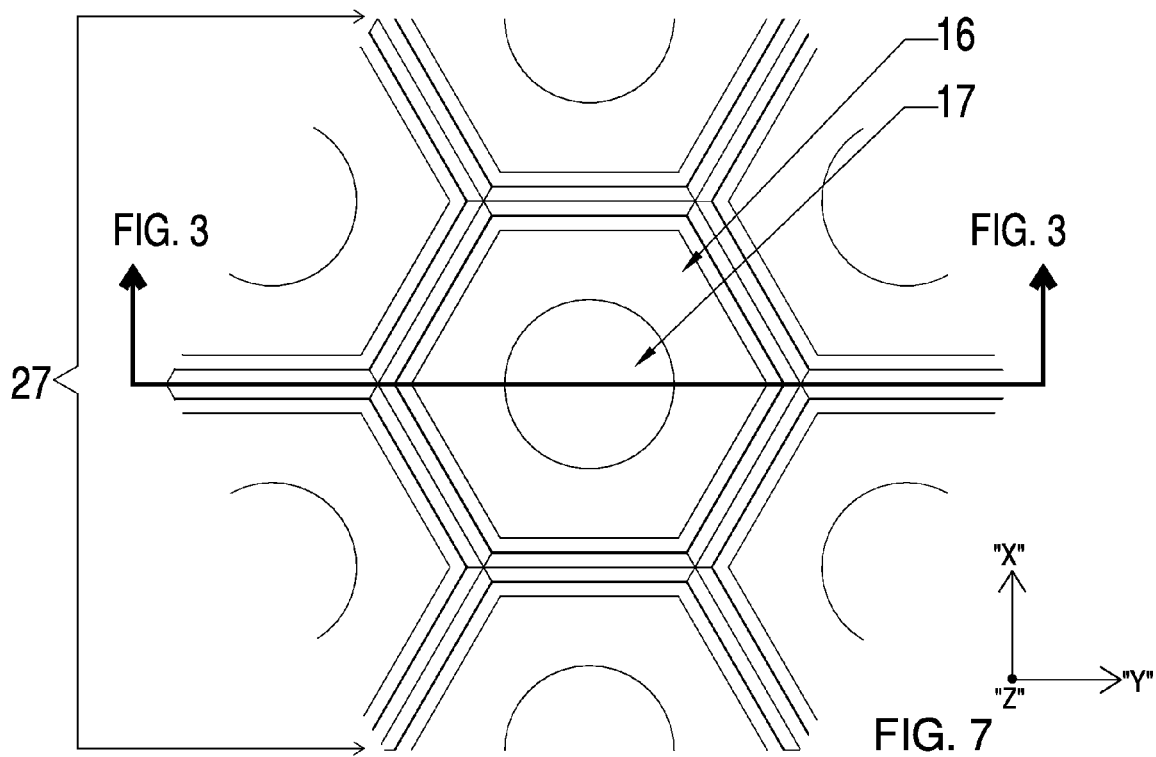
FIG. 7 is schematic plan view illustration of the upper surface of the hexagonal structural grid of a partial MPSSCP without the composite tread design on the uppermost surface, as shown in FIG. 6.
Figure 8:
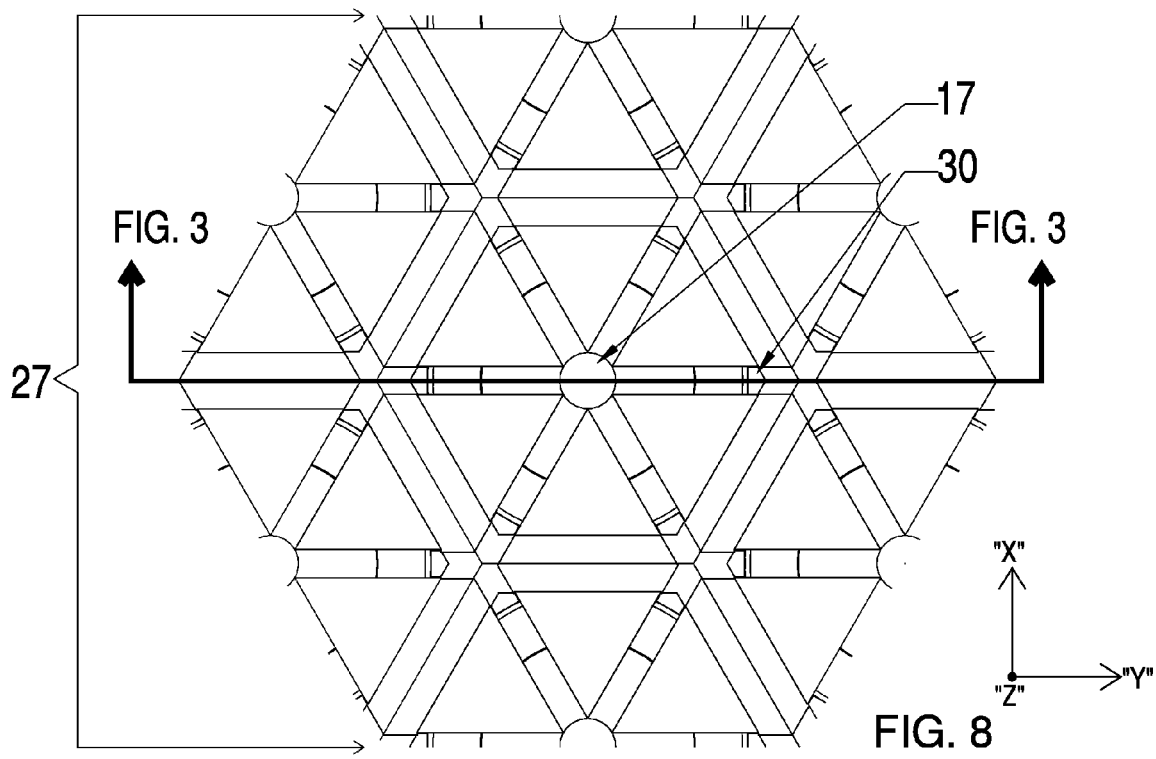
FIG. 8 is a schematic plan illustration of the partial MPSSCP of the underside of the LEG pluralities.

FIGS. 3 and 6, The uppermost surface (10), of the MPSSCP (08) would embody the ability to contain in its upper surface (10), a composite tread design (13) of "X", "Y" and Z" tri-axis differential rigidity to furnish skid resistance, shed water along the "X" and "Y" axis, and in its preferable embodiment be partially comprised of an aggregate (12). The aggregate (12), defined as a material of stone/glass and or polymer has capabilities that can be utilized for heat retention and further furnish additional surface frictional resistance to the uppermost surface (10) of the MPSSCP (08). The aggregate (12) further contained within a preferable compound sourced from recycled vehicle tires "crumb rubber" (11), or other new and or recycled polymer material creating the composite tread design (13) and embodying the ability to transpose forces, into the system by deforming tri-axially in the "X", "Y" and "Z" axis. The design, and compound mixture, of the composite tread design (13) is embodied with an insert rod (14), composed of a preferred non-magnetic material to increase rigidity in the "Y" axis thereby increasing electrical production by spreading the area of influence (02), of a vehicles' tire (03) kinetic movement on the uppermost surface (10), along the "Y" axis during vehicles traversing in the "X" axis.

Sintered/bonded and or affixed to the underside of the composite tread design (13) may or may not be a foil (15) of thickness and material; in its preferred embodiment; a flexible, heat conducting material, e.g. aluminum, copper, polymer or other material embodying the necessary functions described. This foil (15) embodiment comprised of of metal and/or a polymer aids in the dispersal of heat generated within the LEG (09) sintered/bonded and or affixed to the underside of the composite tread design (13). The foil (15) surface is embodied within the MPSSCP's (08).

The hexagonal structural grid (27) in the embodiment of the preferred alternative is comprised of a close-packed hexagonal grid in the "X" and "Y" axis. An alternative structural grid may be tetrahedronal, pentagonal, octahedronal, decahedronal, or circular. The bottom of a MPSSCP (08) has a semi-rigid material (31) of recycled and or recyclable polymer of prior art, sintered/bonded and or affixed to the underside of the invention that will encase the LEG's (09) exit wiring (29) and allow for the MPSSCP (08) to be flexible enough to accommodate an altitude and curvature variation on the roadway surface along the "Y" and "Z" axis. The entire MPSSCP (08), with its accessory panels (04), (05), and (07) are then deployed, and installed by a method of sintering/ bonding and or affixing, to roadway surfaces (32) and or other pathways of vehicular circulation.

The MPSSCP (08) shall have in its preferred embodiment the LEGs (09) omitted from the hexagonal structural grid (27) at each vehicular lane's center. This embodiment will allow vehicles to employ a magnetic sensing device of future or prior arts at the magnetic void to develop autopilot capabilities in concert with vehicular electronic prior arts.

Aesthetic colorant may be added to the uppermost surface (10) or the composite tread design (13) to facilitate a visual enhancement to the roadway surface. The colorant may vary in number of colors or design for use as roadway marking, signage, or advertising.

The invention is a plurality of Modular Prefabricated Structural Sandwich Composite Panels (MPSSCPs), with its attendant accessory panels placed on a road surface. The invention has the ability to withstand lateral forces generated by accelerating and decelerating vehicles and to recover kinetic and gravitational energies generated by moving vehicles, containing the ability to generate electrical current and selective quantities of heat as well as resurface roadways and be implemented for future auto pilot augmentation.

What is claimed is:

1. A linear electric generator LEG for the generation of electrical energy through conversion of mechanical work, comprising:
    a housing structured to house at least a main core magnet;
    said main core magnet movably connected to an insert guide;
    a magnet wire coil disposed about the outer surface of said insert guide;
    a lower magnet fixedly disposed within one end of said insert guide and oriented therein so as to exert a coercive restoring force in opposing magnetic relation to said main core magnet;
    an o-ring disposed between said lower magnet and said main core magnet, and structured to absorb the force of impact of said main core magnet; and
    a multi-legged retaining guide comprising a plurality of flanged prongs cooperatively structured with said housing to restrain linear displacement of said main core magnet so as to prevent said main core magnet from exiting said housing, said prongs of said multi-legged retaining guide being disposed within said housing.

2. The apparatus of claim 1 wherein said structural housing comprises a hexagonal outer cross-sectional shape.

3. The apparatus of claim 1, further comprising a low frictional resistance coating disposed on the outer surface of said main core magnet.

4. A modular prefabricated structural sandwich composite panel MPSSCP for the conversion of mechanical work done by vehicles on a roadway surface to electrical energy, the MPSSCP comprising:
    a composite tread structured to mechanically interact with the tires of the vehicles;
    a foil affixed to an underside of said composite tread; and
    an array comprising a plurality of linear electric generators LEGs, each of said plurality of LEGs connected to a corresponding portion of said foil and comprising:
        a housing structured to house at least a main core magnet;
        said main core magnet movably connected to an insert guide;
        a magnet wire coil disposed about the outer surface of said insert guide;
        a lower magnet fixedly disposed within one end of said insert guide and oriented therein so as to exert a coercive restoring force in opposing magnetic relation to said main core magnet;
        an o-ring disposed between said lower magnet and said main core magnet, and structured to absorb the force of impact of said main core magnet; and
        a multi-legged retaining guide comprising a plurality of flanged prongs cooperatively structured with said housing to restrain linear displacement of said main core magnet so as to prevent said main core magnet from exiting said housing, said prongs of said multi-legged retaining guide being disposed within said housing.

5. The MPSSCP of claim 4 wherein said foil comprises a thermally conductive material of construction structured to diffuse thermal energy produced by said plurality of LEGs and said composite tread.

6. The MPSSCP of claim 4 wherein said composite tread comprises an aggregate material of construction disposed at least on an uppermost surface of said composite tread.

7. The MPSSCP of claim 4 further comprising an insert rod disposed within said composite tread.

8. The MPSSCP of claim 4 wherein said structural housing of said LEG comprises a hexagonal outer cross-sectional shape.

9. A system for the conversion of mechanical work done by vehicles on a roadway surface to electrical energy, the system comprising:
    a plurality of modular prefabricated structural sandwich composite panels MPSSCPs disposed upon the surface of a roadway, each MPSSCP comprising:
        a composite tread structured to mechanically interact with the tires of the vehicles;
        a foil affixed to an underside of said composite tread; and
        an array comprising a plurality of linear electric generators LEGs, each of said plurality of LEGs connected to a corresponding portion of said foil and comprising:
            a housing structured to house at least a main core magnet;
            said main core magnet movably connected to an insert guide;
            a magnet wire coil disposed about the outer surface of said insert guide;
            a lower magnet fixedly disposed within one end of said insert guide and oriented therein so as to exert a coercive restoring force in opposing magnetic relation to said main core magnet;

an o-ring disposed between said lower magnet and said main core magnet, and structured to absorb the force of impact of said main core magnet; and a multi-legged retaining guide comprising a plurality of flanged prongs cooperatively structured with said housing to restrain linear displacement of said main core magnet so as to prevent said main core magnet from exiting said housing, said prongs of said multi-legged retaining guide being disposed within said housing;

at least one ramp panel disposed upon the surface of the roadway, said ramp panel being interconnected to one of said plurality of MPSSCPs and structured for the transition of the vehicle between the roadway and said one of said plurality of MPSSCPs; and at least one shoulder panel, said shoulder panel being interconnected to a corresponding one of said plurality of MPSSCPs and comprising a linkage apparatus electrically interconnected to said corresponding one of said plurality of MPSSCPs.

10. The system of claim 9 further comprising at least one wedge panel, said wedge panel being disposed and structured to position one of said MPSSCPs relative to another of said MPSSCPs.

11. The apparatus of claim 1 wherein said insert guide comprises at least one longitudinally extending groove disposed on an inner surface of said insert guide, said at least one groove structured to facilitate movement of said main core magnet relative to said insert guide.

12. The MPSSCP of claim 4 wherein said insert guide of said LEG comprises at least one longitudinally extending groove disposed on an inner surface of said insert guide, said at least one groove structured to facilitate movement of said main core magnet relative to said insert guide.

13. The system of claim 9 wherein said insert guide of said LEG comprises at least one longitudinally extending groove disposed on an inner surface of said insert guide, said at least one groove structured to facilitate movement of said main core magnet relative to said insert guide.

14. The system of claim 9 wherein said structural housing of said LEG comprises a hexagonal outer cross-sectional shape.

\* \* \* \* \*